No. 868,739. PATENTED OCT. 22, 1907.
W. WEBBER.
GRAIN LIFTING DEVICE FOR HARVESTERS.
APPLICATION FILED APR. 27, 1907.
3 SHEETS—SHEET 3.
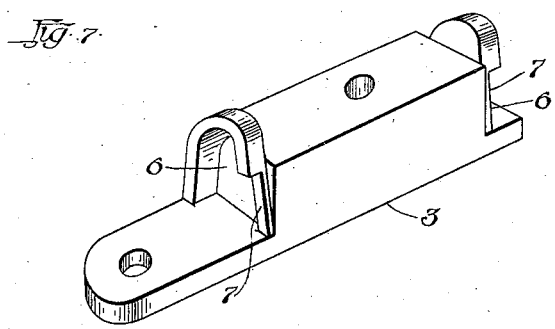
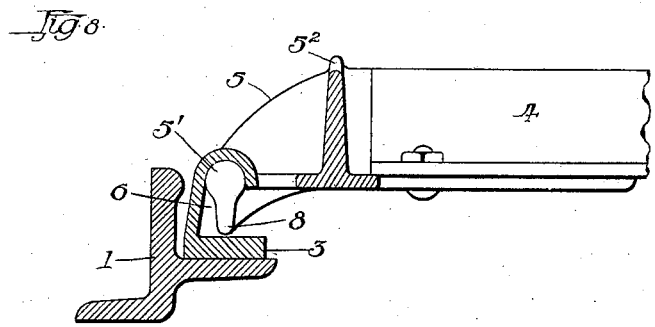
Witnesses:
F. W. Hoffmeister,
J. N. Daggett.
Inventor
William Webber
By J. C. Warner,
Attorney.

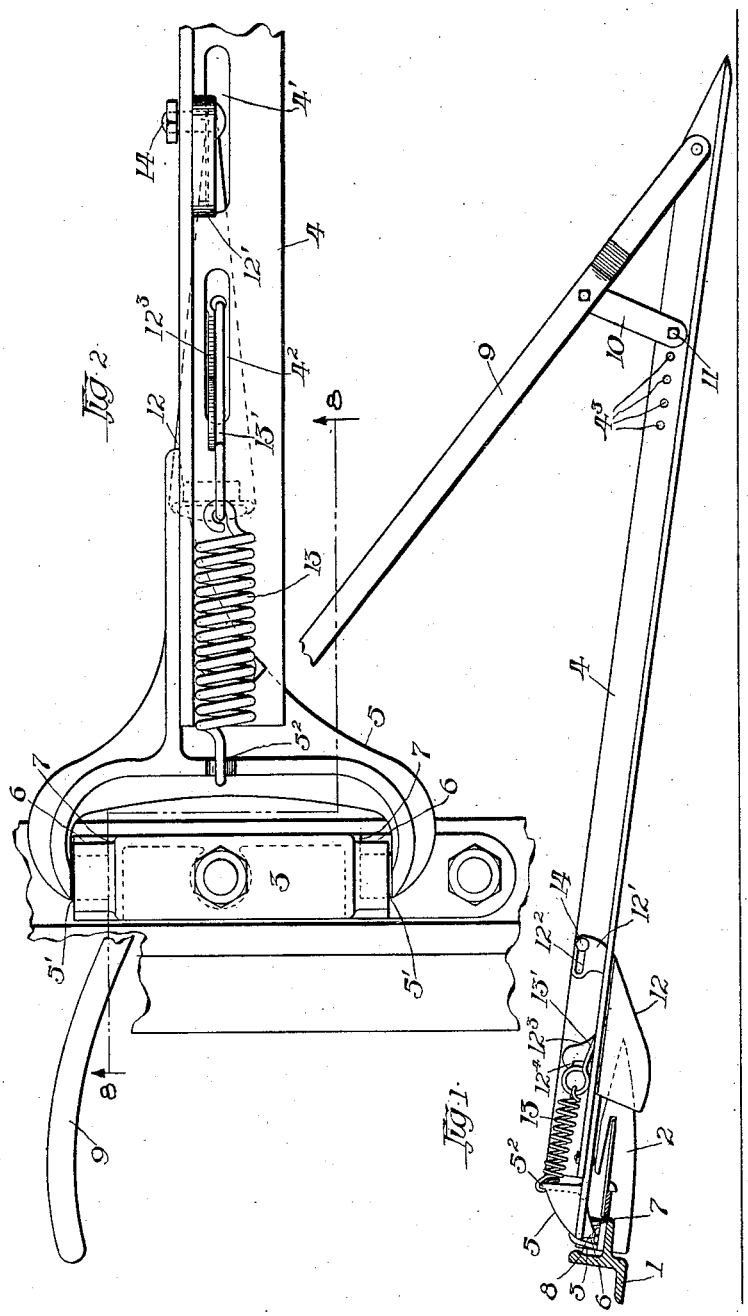

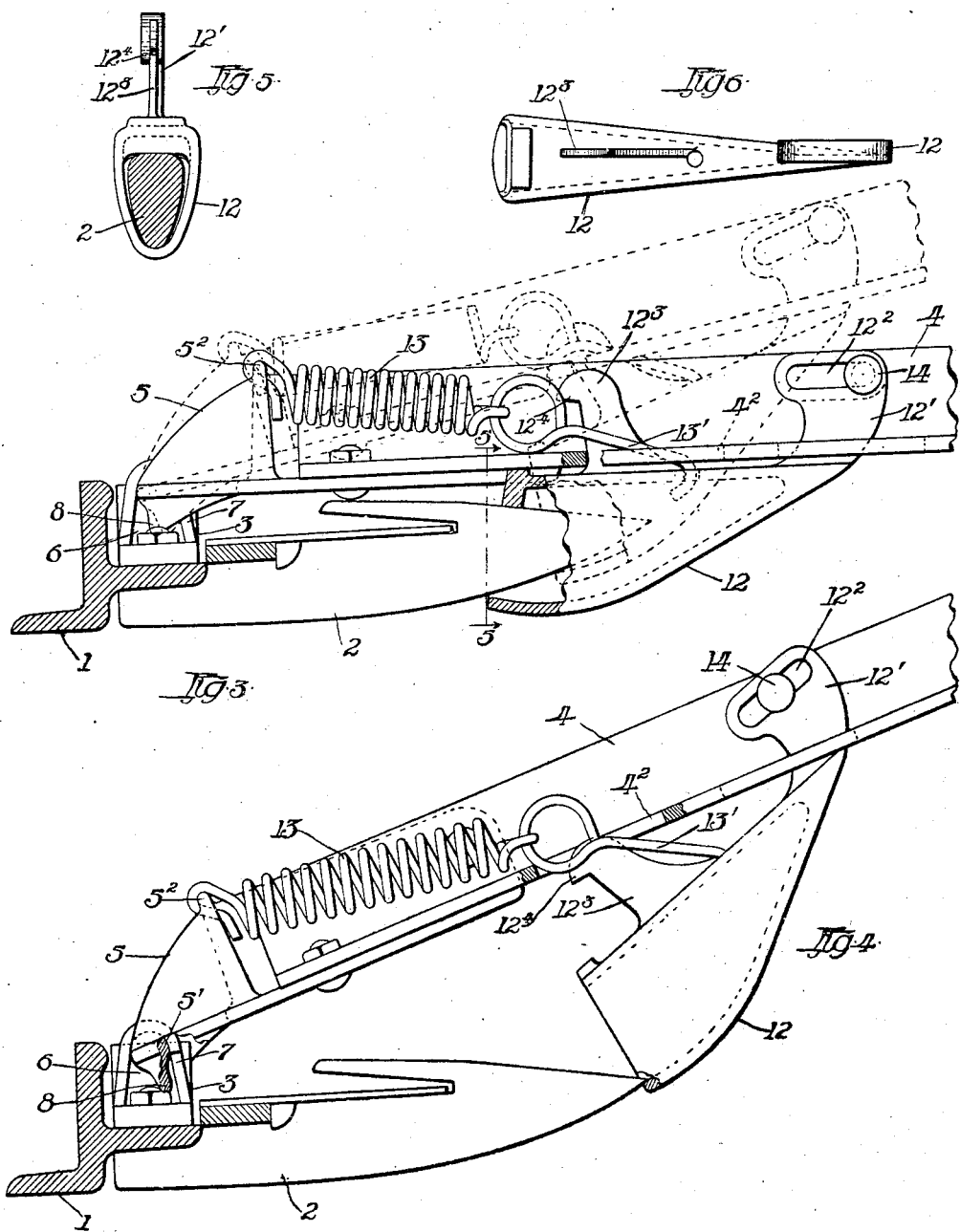

UNITED STATES PATENT OFFICE.

WILLIAM WEBBER, OF CHICAGO, ILLINOIS, ASSIGNOR TO INTERNATIONAL HARVESTER COMPANY, A CORPORATION OF NEW JERSEY.

GRAIN-LIFTING DEVICE FOR HARVESTERS.

No. 868,739.  Specification of Letters Patent.  Patented Oct. 22, 1907.

Application filed April 27, 1907. Serial No. 370,570.

*To all whom it may concern:*

Be it known that I, WILLIAM WEBBER, a citizen of the United States, residing at Chicago, in the county of Cook and State of Illinois, have invented a new and useful Improvement in Grain-Lifting Devices for Harvesters, of which the following is a complete specification.

In harvesting down, tangled and heavy grain it is necessary to lift the grain from the ground before cutting same, and to do this grain lifting fingers are secured to the finger bar and made to project forwardly therefrom. Such devices and their function are well understood in the art.

The lifting fingers heretofore employed have not been sufficiently elastic in their vertical movement and were not adapted to be readily attached and detached to and from the finger bar of the harvester, and hence were to this extent objectionable.

The object of the present invention is to relieve the construction of the above mentioned objections, to insure a proper connection between the vertically movable arm of the lifting finger and the corresponding guard finger when in operation, and to provide a finger which is well adapted to be applied to practically all types of harvesters.

Referring to the accompanying drawings—Figure 1 represents a side elevation of the device applied to the finger bar and guard of a harvester, the finger bar being shown in section. Fig. 2 is an enlarged plan of the rear end of the device shown in the preceding figure. Fig. 3 is an enlarged side elevation of the rear end of the grain lifter with the parts in their normal working position as shown in Fig. 1. Fig. 4 is a view corresponding with Fig. 3 but with the arm raised to disengage the thimble from the guard. Fig. 5 is a transverse section taken through the guard adjacent to the rear end of the thimble, as indicated by the line 5—5 in Fig. 3; Fig. 6 is a detail plan of the thimble. Fig. 7 is a perspective view of the supporting block with the grain elevator detached; and Fig. 8 is a detail section taken on the line 8—8 of Fig. 2, and is designed to show the projection on the trunnion for holding same in position on the supporting block.

In the drawings the harvester finger bar is designated by 1, and to this are fixed the guards 2. On the finger bar 1 is secured the block 3, which forms a pivotal support for the forwardly projecting arm 4, which is formed preferably of an angle bar. To give lateral rigidity to the arm, it is made to connect with the block 3 by means of a yoke 5, and both the block and yoke are given considerable width, as shown in Fig. 2. Recesses, as 6, are formed in the ends of the block 3, into which fit the yoke trunnions $5^1$, the forward side of one of the recesses being cut away, as at 7, to enable the trunnions to be introduced into the recesses and the yoke thereby attached. Shoulders 8, formed integral with and projecting downwardly from the under side of the trunnions, serve to hold the same at the upper side of the recess, in which position the arm 4 is interlocked with and effectually prevented from becoming detached from the block 3. On the forward end of the arm 4 is pivotally mounted the lifting finger 9, which is made adjustable in height at its rear end by moving the lower end of the connecting strap 10 to a registering position with respect to any one of the series of apertures $4^3$ in the bar 4 and securing with the bolt 11.

To yieldingly sustain the forward end of the lifting finger and to properly deflect the grass below the guard 2, whatever the elevation of the arm 4 in its working position, a thimble 12 is mounted on the arm 4 and engages with its rear end the point of the guard 2. A coil spring 13 is interposed between the thimble and an upwardly projecting lug $5^2$ on the yoke 5. The angle bar forming the arm 4 is provided with the slots $4^1$ and $4^2$, and through the slot $4^1$ projects the upper forward end $12^1$ of the thimble. A slot $12^2$ is formed in said end which engages the bolt 14, thus providing not only a pivotal movement but also a longitudinal movement of said thimble. Through the slot $4^2$ extends the rod $13^1$, which connects the thimble with the spring 13, and through this same slot projects also the lug $12^3$, which is formed on the rearward end of the thimble. This lug $12^3$ contacts the rear end of the slot $4^2$ and limits the rearward longitudinal movement of the thimble 12. In normal working position the thimble will occupy the full line position shown in Fig. 3, in which the forward end of the slot $12^2$ will bear against the bolt 14. The arm 4 will thus be permitted to swing vertically a limited amount without disengaging the thimble 12 from the guard 2, the extent of this movement being determined by means of the shoulder $12^4$ on the lug $12^3$ and as indicated by the dotted line position of Fig. 3. If it is desired to disengage the attachment from the finger bar, the arm 4 is raised from the dotted line position of Fig. 3 and the thimble 12 is pulled forwardly slightly beyond the position shown in Fig. 4. After the arm has been raised to substantially a vertical position the shoulders 8 on the trunnions $5^1$ will have turned sufficiently to permit the trunnion to drop down and the yoke removed.

What I claim as my invention, and desire to secure by Letters Patent, is:

1. In a grain lifting device for harvesting machines, in combination, a supporting block adapted to be secured to the finger bar of a grain harvester, a forwardly projecting arm pivotally mounted thereon, a rearwardly and upwardly extending lifting finger fixed to the forward end of said arm, means engaging the point of the harvester guard and pivotally connecting with the forwardly projecting arm for deflecting the material beneath the guard, and a spring operating to hold the forward end of the arm down in its working position.

2. In a grain lifting device for harvesting machines, in combination, a supporting block adapted to be secured to the finger bar of a grain harvester, a forwardly projecting grain lifter pivotally mounted thereon, a thimble pivotally mounted on said lifter and arranged to engage the point of a guard on the finger bar, and a spring operating both to hold the grain lifter down in its normal working position and the thimble in engagement with the point of the guard.

3. In a grain lifting device for harvesting machines, in combination, a supporting block adapted to be secured to the finger bar of a grain harvester, a forwardly projecting grain lifter pivotally mounted thereon, a longitudinally movable thimble pivotally mounted on said arm and adapted to engage the point of a guard on the finger bar, and a spring operating both to hold the grain lifter down in its normal working position and the thimble in engagement with the point of the guard.

4. In a grain lifting device for harvesting machines, in combination, a supporting block adapted to be secured to the finger bar of a grain harvester, a forwardly projecting grain lifter pivotally mounted thereon and detachable therefrom when in an approximately vertical position, a thimble pivotally mounted on said lifter and arranged to engage the point of a guard on the finger bar, and a spring operating both to hold the grain lifter down in its normal working position and the thimble in engagement with the point of the guard.

5. In a grain lifting device for harvesting machines, in combination, a supporting block adapted to be secured to the finger bar of a grain harvester, a forwardly projecting arm pivotally mounted thereon, a rearwardly and upwardly extending lifting finger fixed to the forward end of said arm, a thimble provided at its forward end with a longitudinally extending slot which engages a pin or bolt on the said arm, the rear end of said thimble being arranged to engage the point of a guard on the finger bar, and a spring operating to hold the arm down in its working position and the thimble in engagement with the point of the guard.

6. In a grain lifting device for harvesting machines, in combination, a supporting block adapted to be secured to the finger bar of a grain harvester, a forwardly projecting, vertically movable grain lifter pivotally mounted thereon, a thimble pivotally mounted on said lifter and designed to engage the point of a guard on the finger bar, a stop in connection with said thimble for limiting the vertical movement upwardly of said grain lifter, and a spring reacting between the thimble and lifter for holding same in proper working relation.

7. In a grain lifting device for harvesting machines, in combination, a supporting block adapted to be secured to the finger bar of a grain harvester, a forwardly projecting, vertically movable grain lifter pivotally mounted thereon, a longitudinally movable thimble pivotally mounted on said lifter and designed to engage the point of a guard on the finger bar, stops in connection with said thimble for limiting both the horizontal and vertical movement of said lifter, and a spring reacting between the thimble and lifter for holding same in proper working relation.

8. In a grain lifting device for harvesting machines, in combination, a supporting block adapted to be secured to the finger bar of a grain harvester, a yoke detachably secured to said block, a vertically movable, forwardly projecting angle bar provided with a slot and fixed to said yoke, a rearwardly and upwardly extending grain lifting finger adjustably mounted on the forward end thereof, a guard engaging thimble pivotally mounted in the slot of said angle bar and longitudinally movable therein, stops formed on said thimble to limit its longitudinal movement and the vertical movement of said angle bar, and a spring interposed between the yoke and thimble, said spring operating to hold the thimble into engagement with the guard and the grain lifting finger yieldingly downward in working position.

WILLIAM WEBBER.

Witnesses:
CLINTON A. HAGADONE,
HUGH W. COOK.